(12) United States Patent
Gieskes et al.

(10) Patent No.: US 6,848,338 B1
(45) Date of Patent: Feb. 1, 2005

(54) HIGH ACCELERATION SPINDLE DRIVE AND METHOD OF USING SAME

(75) Inventors: Koenraad Alexander Gieskes, Binghamton, NY (US); Stanislaw Wladyslaw Janisiewicz, Endwell, NY (US); Daniel Joseph Hibbard, Binghamton, NY (US); Darrin Michael Weiss, Vestal, NY (US); John E. Danek, Vestal, NY (US); James W. Tripp, Whitney Point, NY (US)

(73) Assignee: Delaware Capital Formation, Inc., Wilmington, DE (US)

( * ) Notice: Subject to any disclaimer, the term of this patent is extended or adjusted under 35 U.S.C. 154(b) by 155 days.

(21) Appl. No.: 10/272,015

(22) Filed: Oct. 17, 2002

(51) Int. Cl.[7] ............................................... B23B 29/24
(52) U.S. Cl. ......................... 74/821; 74/816; 414/752.1
(58) Field of Search ............................... 74/813 R, 816, 74/821, 826; 29/743, 739; 414/752.1

(56) References Cited

U.S. PATENT DOCUMENTS

| | | | | |
|---|---|---|---|---|
| 4,706,379 A | * | 11/1987 | Seno et al. ................... 29/740 |
| 4,794,689 A | * | 1/1989 | Seno et al. ................... 29/740 |
| 5,070,598 A | * | 12/1991 | Itagaki et al. ................. 29/705 |
| 5,987,735 A | * | 11/1999 | Horning et al. ............... 29/737 |
| 2003/0097824 A1 | * | 5/2003 | Mayer et al. ................. 53/478 |
| 2004/0074085 A1 | * | 4/2004 | Gieskes et al. ............... 29/743 |

* cited by examiner

Primary Examiner—David M. Fenstermacher
(74) Attorney, Agent, or Firm—Schmeiser, Olsen & Watts

(57) ABSTRACT

An apparatus for moving a spindle along a longitudinal axis, the apparatus includes a spindle; a drive member for moving said spindle over a range of travel along said longitudinal axis in a first direction; a spring for applying a first force in combination with a second force to the spindle in the first direction; a stop element arranged so as to disengage the second force, such that when said spindle is within a first portion of said range of travel, said first force is applied to said spindle in combination with said second force, and when said spindle is within a second portion of said range of travel, said stop element disengages said second force so only said first force is applied to said spindle.

9 Claims, 7 Drawing Sheets

HIGH ACCELERATION SPINDLE DRIVE AND METHOD OF USING SAME

BACKGROUND OF THE APPLICATION

1. Field of the Invention

The present invention relates to a pick and place apparatus, and a method of using the same, and more particularly to a method of driving a spindle at a high velocity with high accuracy.

2. Description of the Related Art

The present invention relates primarily, although not exclusively, to machines known in the electronics assembly industry as pick and place machines. In a pick and place machine, a spindle mounted on a pick and place head is brought into contact with a die or other electronic component in order to pick up the die or component. The spindle assembly is then moved to another location, where the die or component picked up by the spindle is then placed in an appropriate location for assembly. In order to minimize assembly time, it is desired to move the spindle assembly in the Z, or vertical axis, at as high a speed as practical.

In conventional machines, if the spindle is moved too quickly in the Z direction, a possibility exists that the spindle will contact the die or component at such a speed that could possibly cause damage to the die or component.

OBJECTS AND SUMMARY

Accordingly, it is an object of the present invention to provide a spindle driving assembly that is able to drive a spindle in the Z axis at a high rate of speed without damaging the die or component to be picked up or placed down by the spindle.

It is a further object of the present invention to provide a spindle driving assembly that is able to vary the force applied to a spindle in order to control the acceleration and deceleration of the spindle in order to maximize spindle velocity with damaging any components.

It is a further object of the present invention to provide a spindle driving assembly that is able to determine when the spindle makes contact with the die or component to be picked up thereby so as to send an appropriate signal to the spindle driving assembly that can be used to control movement of the spindle in the Z axis.

It is another object of the present invention to provide a spindle driving assembly that is able to determine when the spindle that is holding a die or component makes contact with the surface on which the die is to be placed so as to send an appropriate signal to the spindle driving assembly that can be used to control movement of the spindle in the Z axis.

According to one embodiment of the present invention, an apparatus for moving a spindle along a longitudinal axis, the apparatus comprises a spindle; a drive member for moving said spindle over a range of travel along said longitudinal axis in a first direction; means for applying a first force in combination with a second force to the spindle in the first direction; a stop clement arranged so as to disengage the second force, such that when said spindle is within a first portion of said range of travel, said first force is applied to said spindle in combination with said second force, and when said spindle is within a second portion of said range of travel, said stop element disengages said second force so only said first force is applied to said spindle.

According to another embodiment of the present invention, a spindle driving assembly comprises a spindle; a spindle drive member mounted for movement from a first position to a second position through a range of movement; a first spring pressing on the spindle either directly or indirectly with a first force; a second spring pressing a second force on the spindle in the spindle driving assembly either directly or indirectly; and a stop element arranged to limit the force of the of the second spring so that when the drive member is within a first portion of the range of movement, the first spring and the second spring exert forces on the spindle and when the drive member is in a second portion of the range of movement, the stop element limits the application of the second spring to reduce or eliminate the force applied by the second spring on the spindle so as to decrease the net force exerted on the spindle; wherein movement of the drive member drives the spindle.

According to yet another embodiment of the present invention, a method of moving a spindle along a longitudinal axis, the method comprises accelerating said spindle with a drive member over a range of travel along said longitudinal axis; applying a first force and a second force to the spindle, either directly or indirectly, during the spindle acceleration through a first portion of the range of travel in order to counter any resistance of the spindle to the acceleration; disengaging the second force after the spindle has passed through the first portion of the range of travel; and applying only the first force to the spindle, either directly or indirectly, during the spindle acceleration through a second portion of the range of travel.

DETAILED DESCRIPTION OF THE PREFERRED EMBODIMENTS

Figure 1:
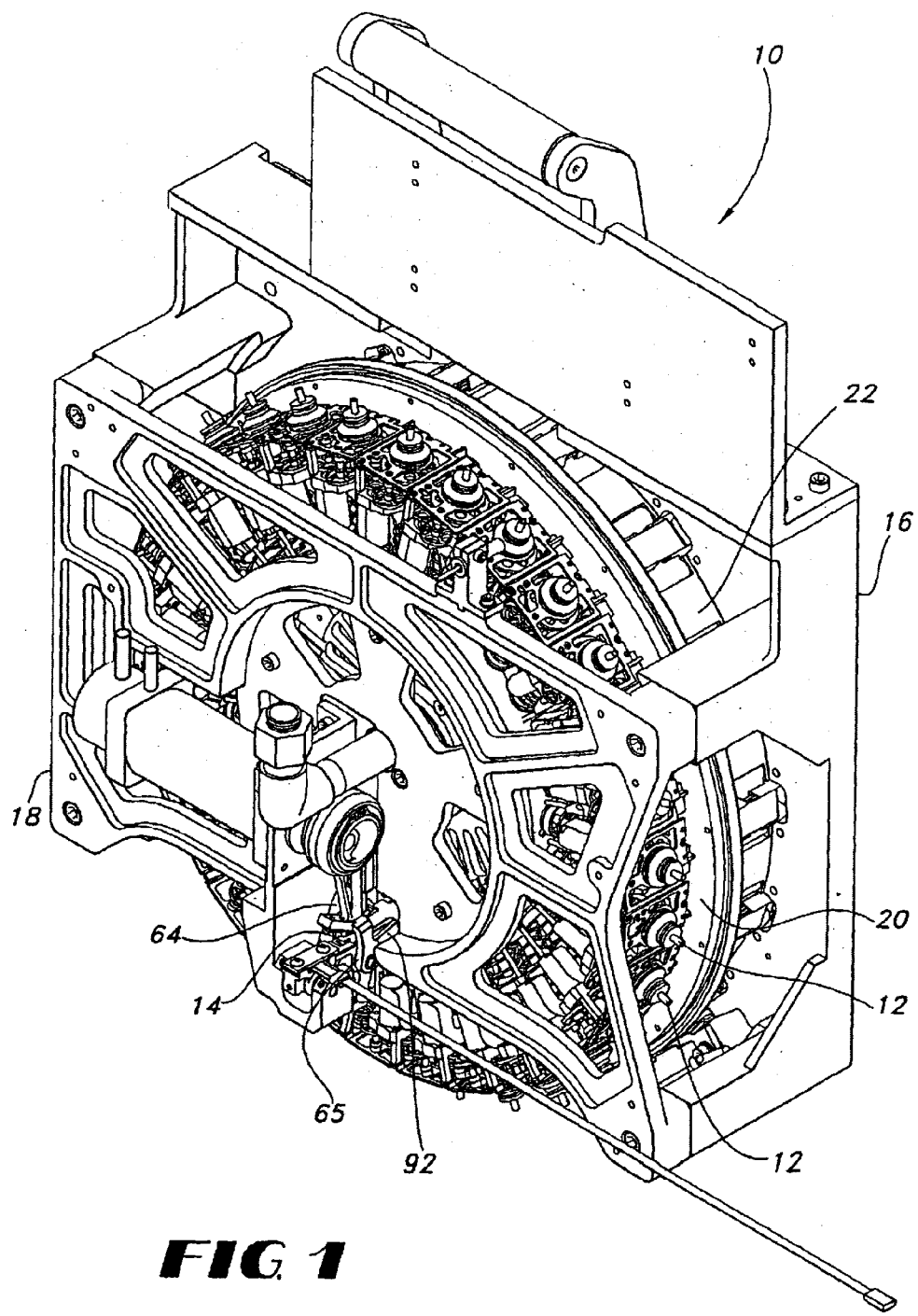
FIG. 1 is a perspective view of a preferred embodiment of a spindle driving assembly according to a preferred embodiment of the present invention.
Figure 2:
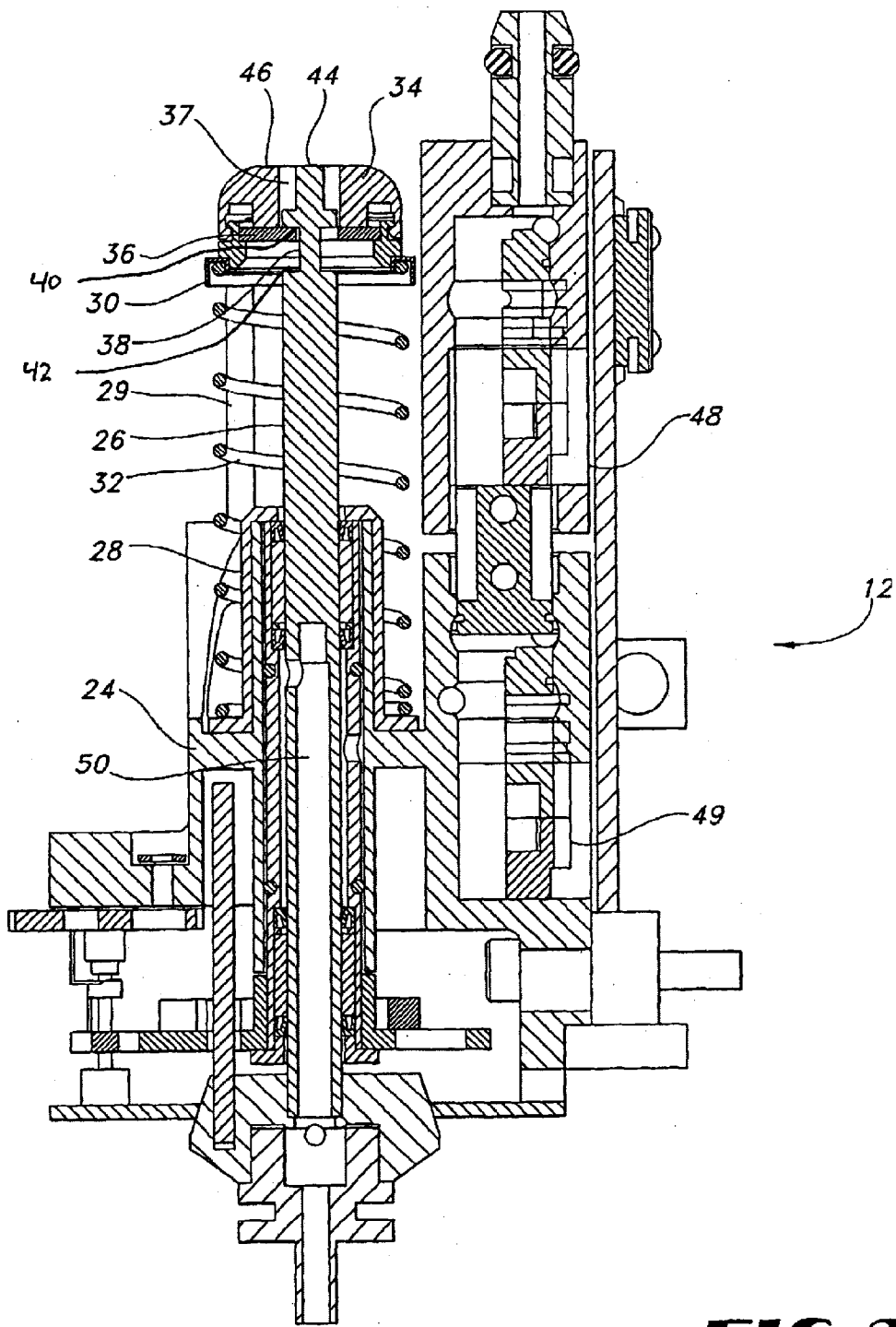
FIG. 2 is a cross-sectional view of a pick and place head according to a preferred embodiment of the present invention.

FIG. 1 is a perspective view of a pick and place apparatus 10 according to a preferred embodiment of the present invention. The pick and place apparatus 10 can be used in a pick and place machine for picking up electronic components and placing them at their intended locations during an assembly operation.

The pick and place apparatus 10 includes a rear portion 16 of a pick and place apparatus frame and a front portion 18 of the pick and place apparatus frame. Located between the front and rear portions 18, 16 of the pick and place apparatus frame is a rotating spindle support 20.

The rotating spindle support 20 includes a plurality of pick and place heads 12 mounted thereon. A motor 22 is provided for driving the rotating spindle support 20 relative to the front and rear portion 18, 16 of the pick and place apparatus frame.

Figure 3:
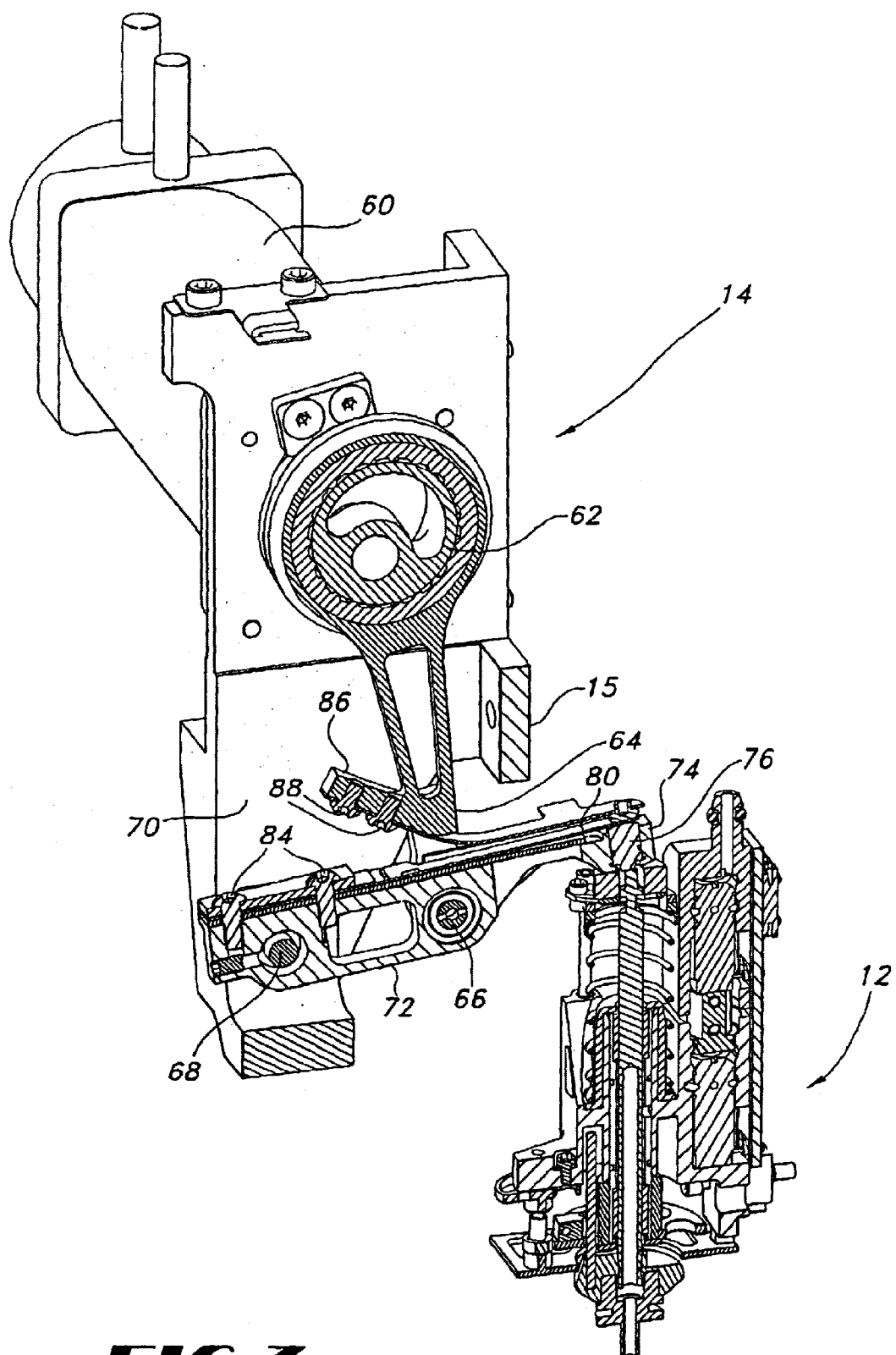
FIG. 3 is a perspective view of a preferred embodiment of an apparatus for driving the spindle according to the present invention in a first mode.
Figure 4:
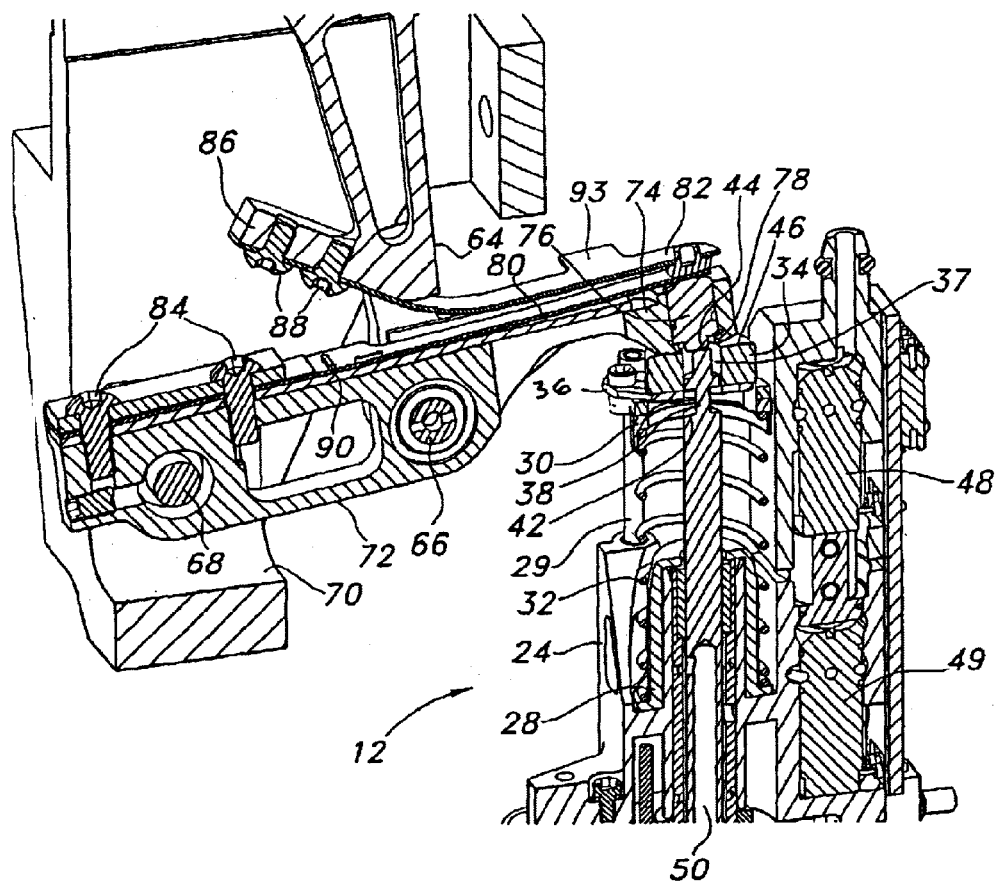
FIG. 4 is a detailed view of a portion of FIG. 3.
Figure 5:
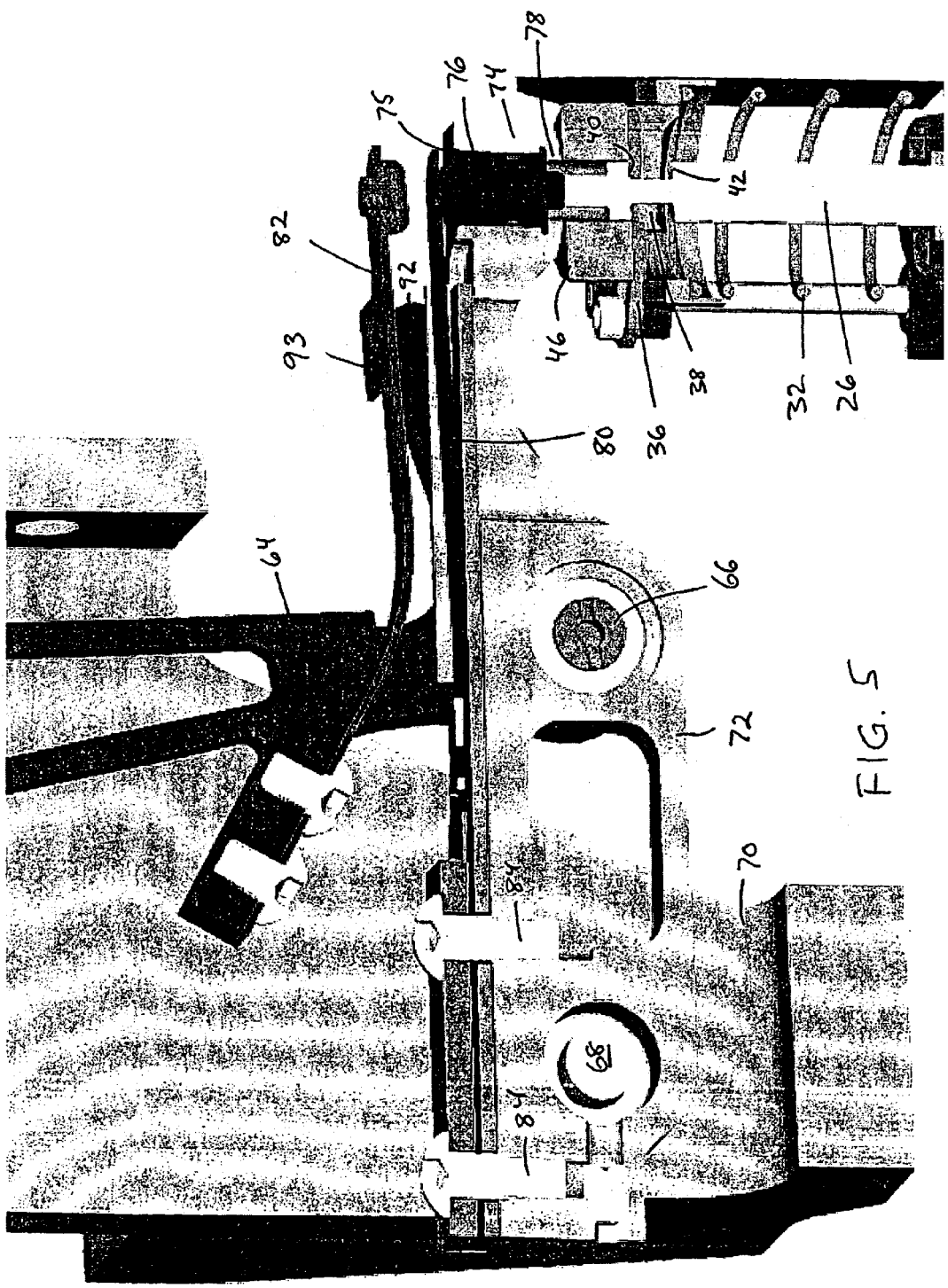
FIG. 5 is a perspective view of a preferred embodiment of an apparatus for driving the spindle according to the present invention in a second mode.

Located at a front portion of the pick and place apparatus 10 is a spindle driving assembly 14. FIGS. 3–5 show more detailed views of the spindle driving assembly 14.

A pick and place head 12 is illustrated in FIGS. 2–5. The pick and place head 12 includes a pick and place head housing 24 which houses the spindle 26. Included in the pick and place head housing 24 is a lower spring support 28. Two shafts 29, only one of which is illustrated in the drawings, guides a spindle assembly head 34 with respect to the pick and place head housing 24 in a manner such that the spindle assembly head 34 can move toward and away from the pick and place head housing 24 along the longitudinal axes of the shafts 29.

At a lower end of the spindle assembly head 34 is an upper spring support 30. A spring 32 is arranged between the lower spring support 28 and the upper spring support 30 so as to urge the spindle assembly head 34 away from the pick and place head housing 24.

The spindle assembly head 34 further includes a spindle engaging flange 36. The spindle engaging flange 36 projects into a bore 37 in the spindle assembly head 34 through which the spindle 26 is slidably mounted. A spindle recess 38 in the spindle 26 defines an upper shoulder 40 and a lower shoulder 42 of the spindle recess 38. The spindle 26 is arranged within the pick and place head housing 24 and the spindle assembly head 34 such that the spindle engaging flange 36 is trapped between the upper and lower shoulders 40, 42 of the spindle recess 38.

The spindle recess 38 enables longitudinal movement of the spindle 26 with respect to the spindle assembly head 34. However, the spindle engaging flange 36 limits the relative movement of the spindle 26 with respect to the spindle assembly head 34.

Adjacent the pick and place head housing 24 are two compressed air valves 48, 49 for controlling an air pressure. One of the compressed air valves 48, 49 is connected to a venturi that generates a vacuum pressure that is selectively applied to an air passage 50 within the spindle 26. The vacuum pressure is used to pick up dies or components to be placed by the pick and place machine. The other compressed air valve 48, 49 is used to control the air pressure so as to deliver a small burst of pressure to the spindle 26 via the air passage 50 in order to eject or remove a die from the end of the spindle 26.

Although the illustrated pick and place head 12 uses compressed air valves 48, 49 to control the vacuum pressure in the spindle 26, the present invention is not limited to vacuum spindles. The present invention may also have applicability in other types of devices, including spindles that use other attachment means for picking up dies and components.

The spindle driving assembly 14 is mounted to the front portion 18 of the pick and place apparatus frame via a flange 15. Details of a preferred embodiment of the spindle driving assembly 14 can be seen in FIGS. 3 and 4.

The spindle driving assembly 14 includes a motor 60 for driving the spindle. assembly. The motor 60 moves in an oscillatory manner, preferably covering a range of approximately 100°, although alternative ranges may be contemplated for the present invention. The motor 60 thus rotates the drive shaft 62 in an oscillatory manner. The drive shaft 62 is eccentric with respect to the axis of rotation of the motor 60.

A drive crank 64 is mounted in a rotatably engaging manner to the drive shaft 62. Accordingly, rotation of the drive shaft 62 by the motor 60 causes the drive crank 64 to move in a substantially vertical direction.

The motor 60 is secured to a spindle driving assembly frame 70, preferably by bolts. The flange 15 by which the spindle driving assembly 14 is mounted to the front portion 18 of the pick and place apparatus frame is also an integral part of the spindle driving assembly frame 70.

A drive arm 72 is pivotally mounted to the spindle driving assembly frame 70 by a pivot mount 68. In addition, a lower end of the drive crank 64 is rotatably connected to the drive arm 72 by a rotatable mount 66. Accordingly, the back and forth oscillatory motion of the motor 60 results in an up and down movement of the drive arm 72.

As can be best seen in FIG. 1, the spindle driving assembly 14 extends through an opening in the front portion 18 of the pick and place apparatus frame so that the drive arm 72 is adjacent to one of the pick and place heads 12. The free end 74 of the drive arm 72 is arranged so as to make contact with the top 46 of the spindle assembly head 34.

The free end 74 of the drive arm 72 further includes a bore for receiving a contact button 76. The contact button 76 is free to slide within the bore. A shoulder 78 at the bottom of the bore limits the downward travel of the contact button 76.

A first blade spring or lever 80 is secured to the drive arm 72 with mounting bolts 84. A free end of the first blade spring 80 applies pressure to the contact button 76, urging the contact button 76 against the shoulder 78. The first blade spring 80 applies a force against the contact button 76 of about 0.5 to 2.5 Newtons, preferably about 1 to 2 Newtons, and most preferably about 1.5 Newtons. However, the present invention is not limited to the force ranges disclosed herein.

A strain gauge 90 is mounted on the first blade spring 80 in order to measure any strain, i.e., bending or deflection, of the first blade spring 80 with respect to the drive arm 72.

Because the first blade spring 80 is relatively thin and flexible, a second blade spring or lever 82 is secured adjacent thereto. One end of the second blade spring 82 is bolted to a flange 86 on the drive crank 64 by mounting bolts 88. The opposite end of the second blade spring 82 rests on top of the first blade spring 80. The second blade spring 82 is mounted in such a way that the free end of the second blade spring 82 applies a pressure on the first blade spring 80, thus increasing the force applied by the first blade spring onto the contact button 76. The force applied by the second blade spring 82 against the first blade spring 80 is approximately 1.5 to 7.5 Newtons, preferably about 3 to 6 Newtons, and most preferably about 5 Newtons. However, the present invention is not limited to the disclosed force ranges.

When the drive arm 72 is in the upward portion of its cycle, the second blade spring 82 rests on the first blade spring 80, thus increasing the pressure applied by the first blade spring 80 on the contact button 76. However, as the drive arm 72 moves downwardly to the lower portion of the cycle, flanges 93 on the second blade spring contact stops 92 that are fixed to the drive crank 64. Although FIGS. 3 and 4 show only one flange 93, as can be seen in FIG. 1, the drive crank 64 includes a fork 65 at the lower end thereof. A flange 93 extends from each prong of the fork 65. The stops 92 engage the flanges 93 and lift the second blade spring 82 off of the first blade spring 80 while the drive arm 72 and the first blade spring 80 continue to move downward. Accordingly, for the lower portion of the cycle, the second blade spring 82 is not in contact with the first blade spring 80, and is thus not applying any additional pressure onto the first blade spring 80.

Figure 6:
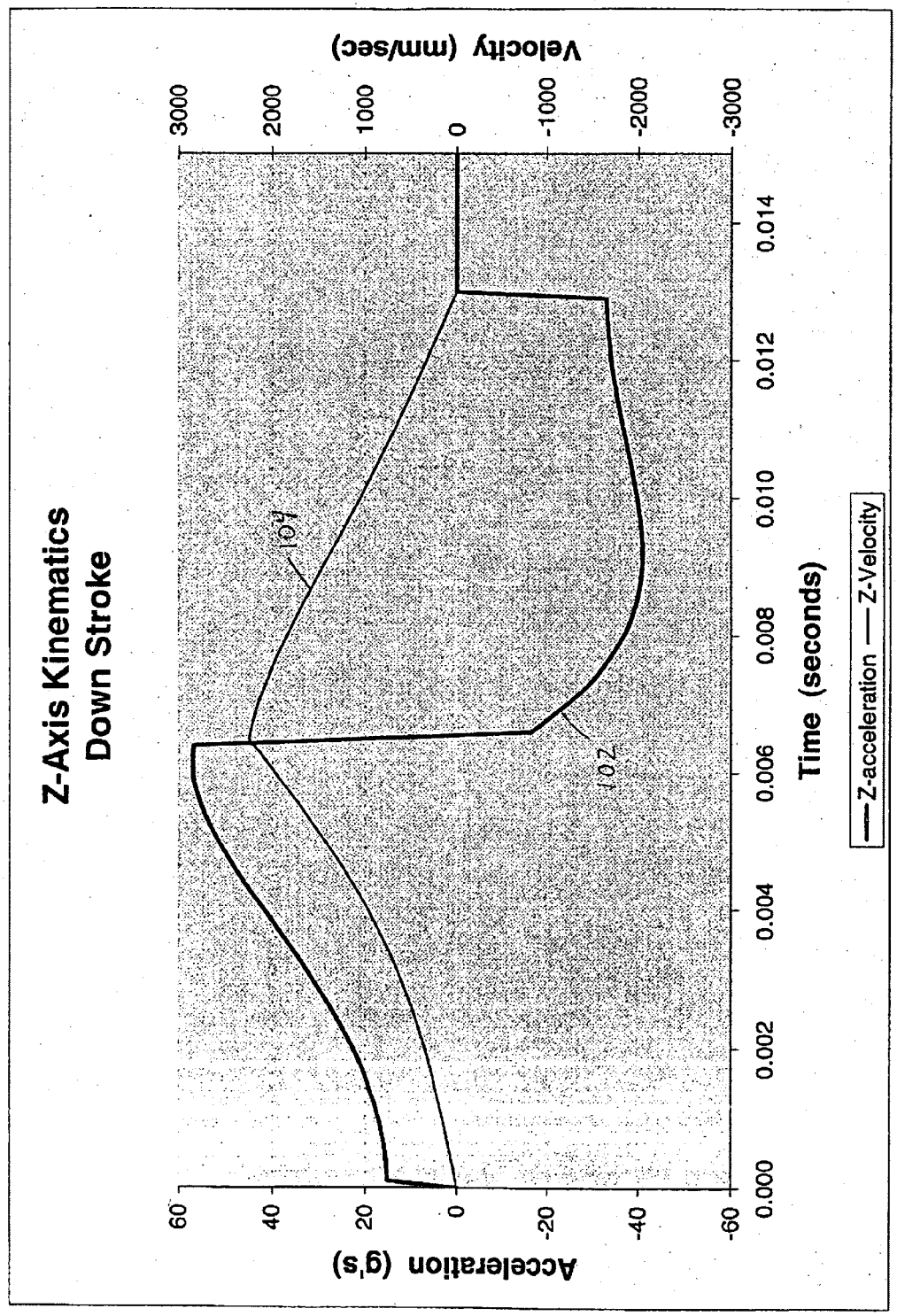
FIG. 6 is a diagram illustrating acceleration and velocity of a spindle according to a preferred embodiment of the present invention.

FIG. 6 is a diagram showing acceleration 102 and velocity 104 of the spindle 26. During the illustrated cycle, acceleration 102 and velocity 104 increase rapidly during the first portion of the cycle to about 57.1 g's. Starting at about 0.006 seconds, the acceleration 104 drops dramatically from about 57.1 g's to about negative 40.9 g's. At about 0.013 seconds, the velocity 104 of the spindle 26 comes to a stop.

Figure 7:
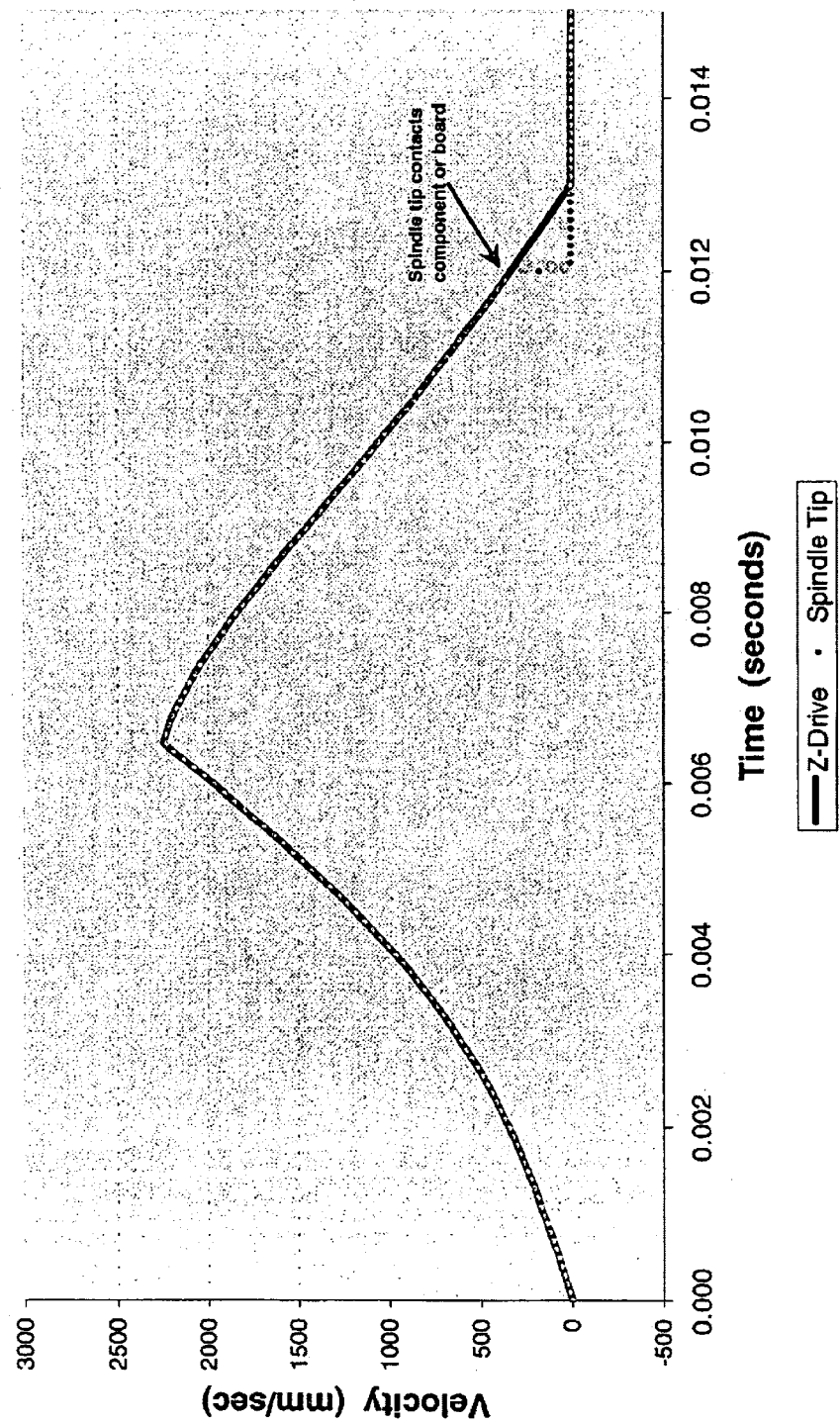
FIG. 7 is a diagram illustrating the velocity of the drive arm and the spindle in a preferred exemplary embodiment.
Figure 2:
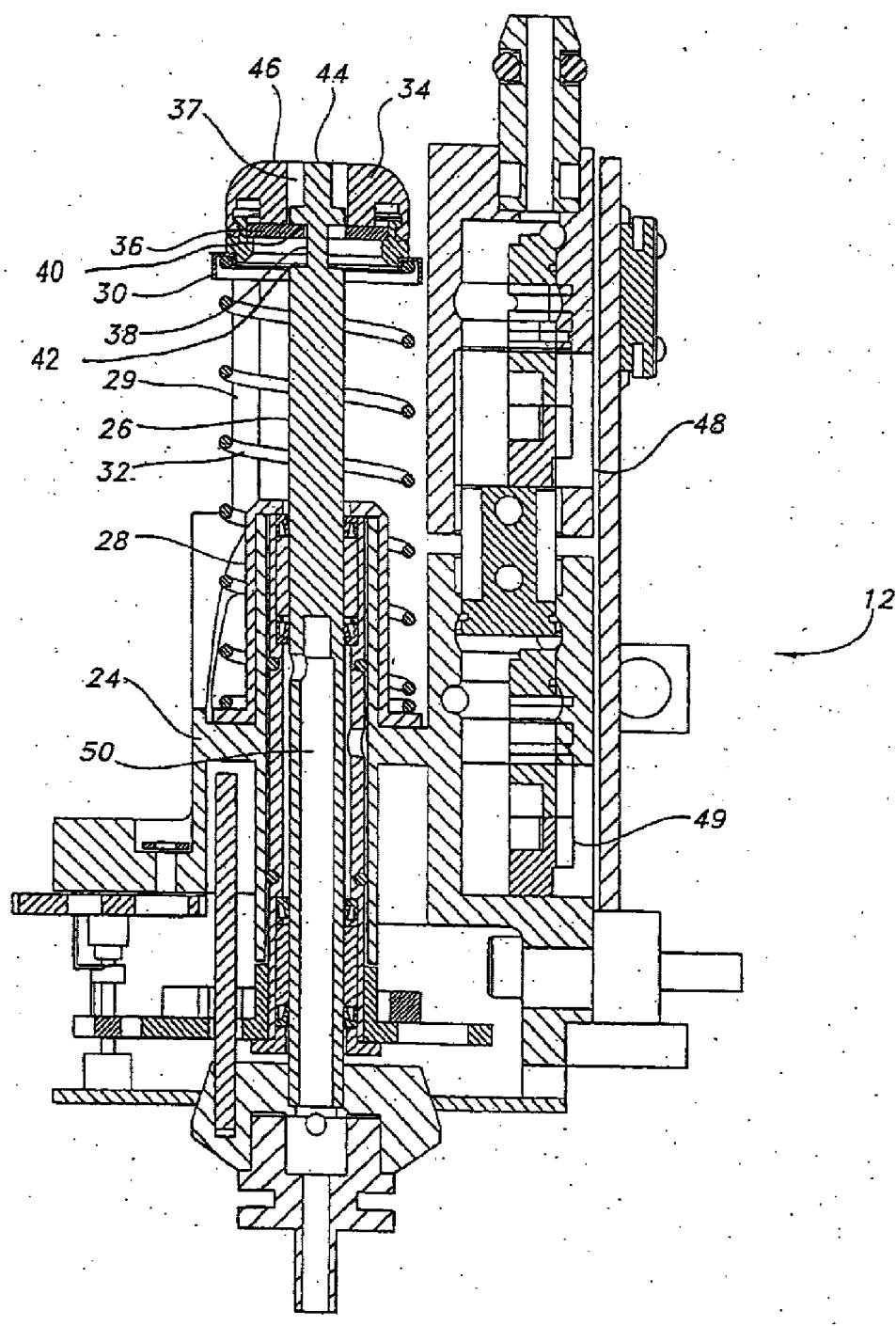
Figure 5:
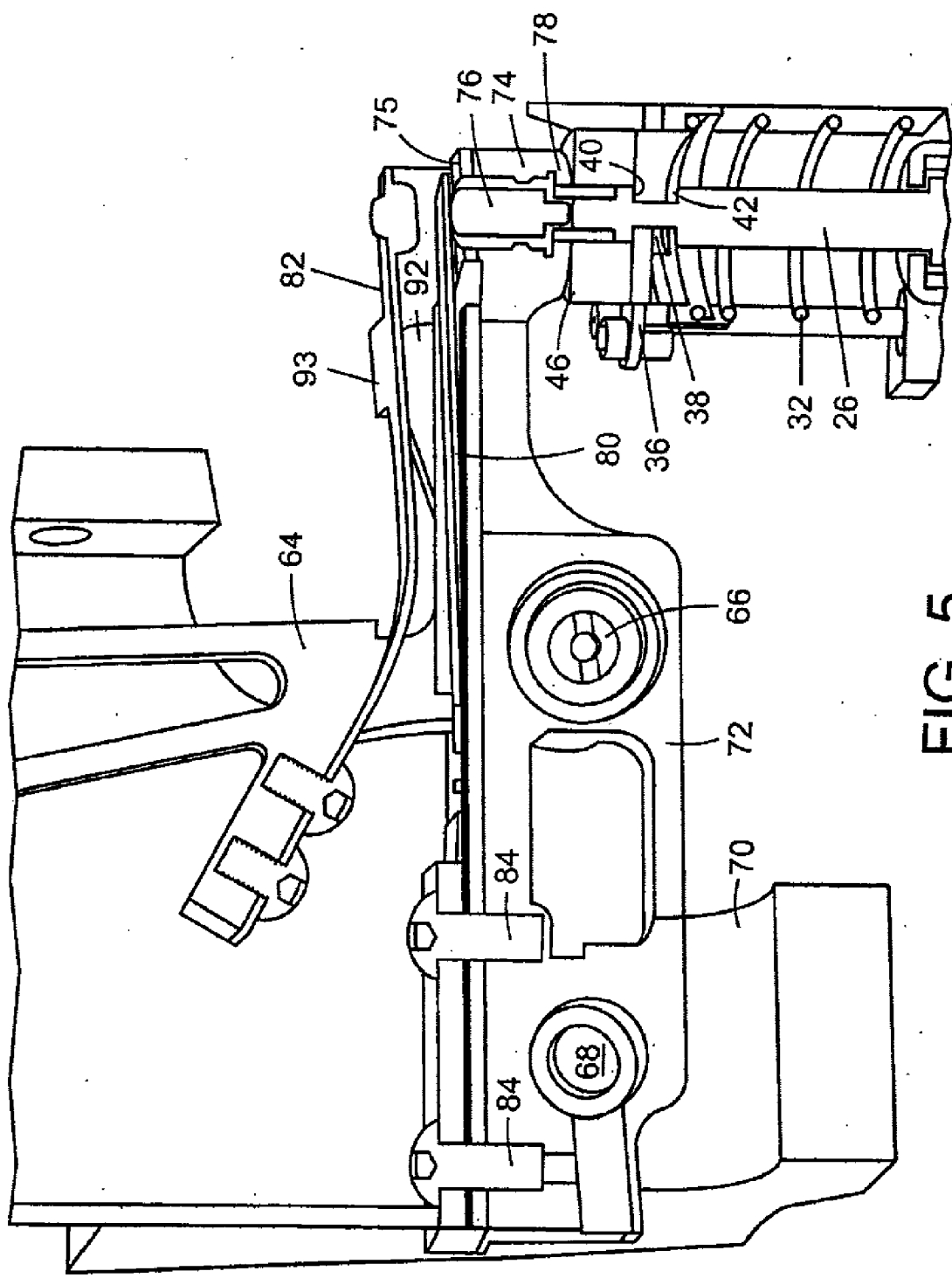
Figure 6:
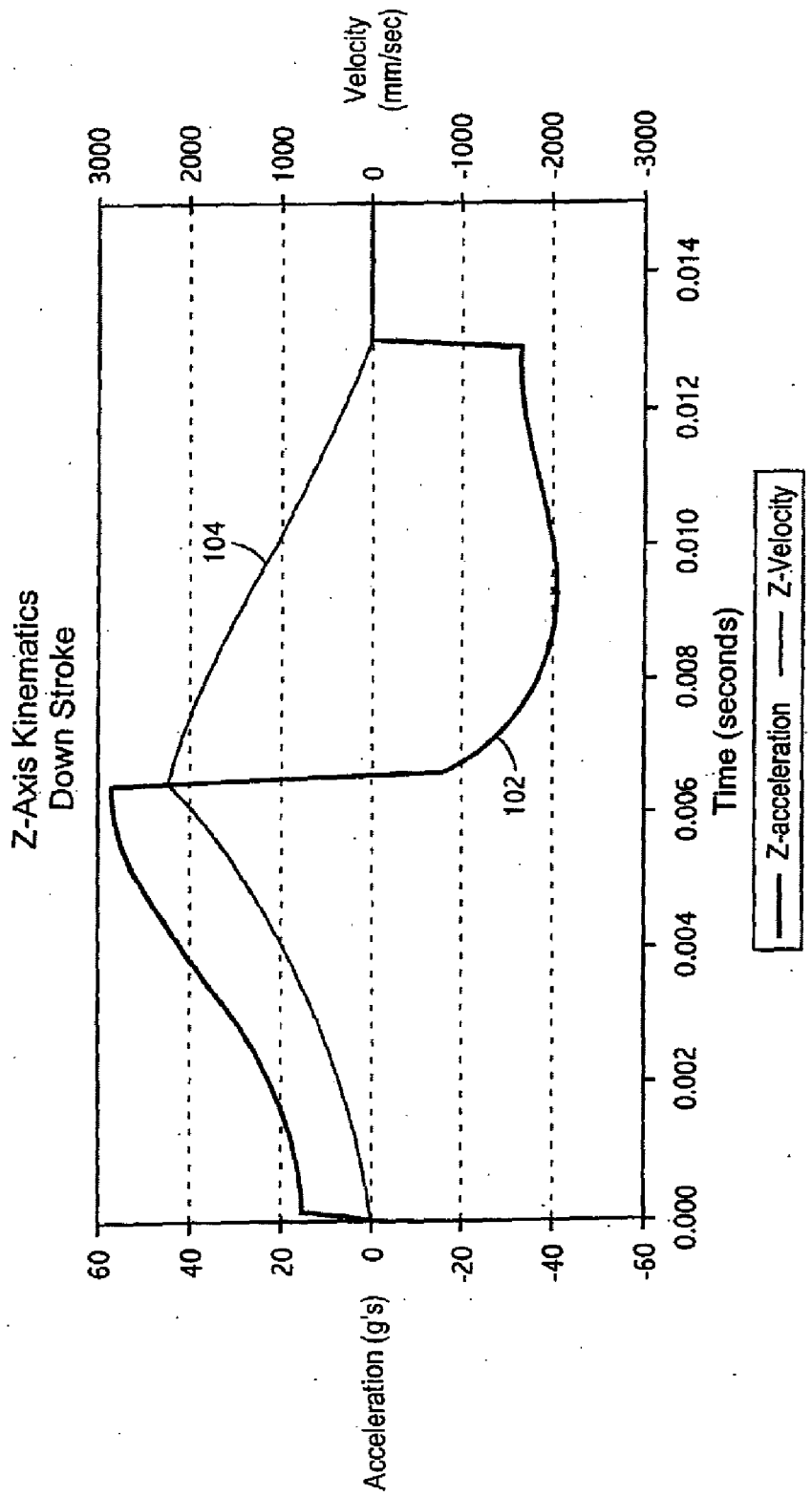
Figure 7:
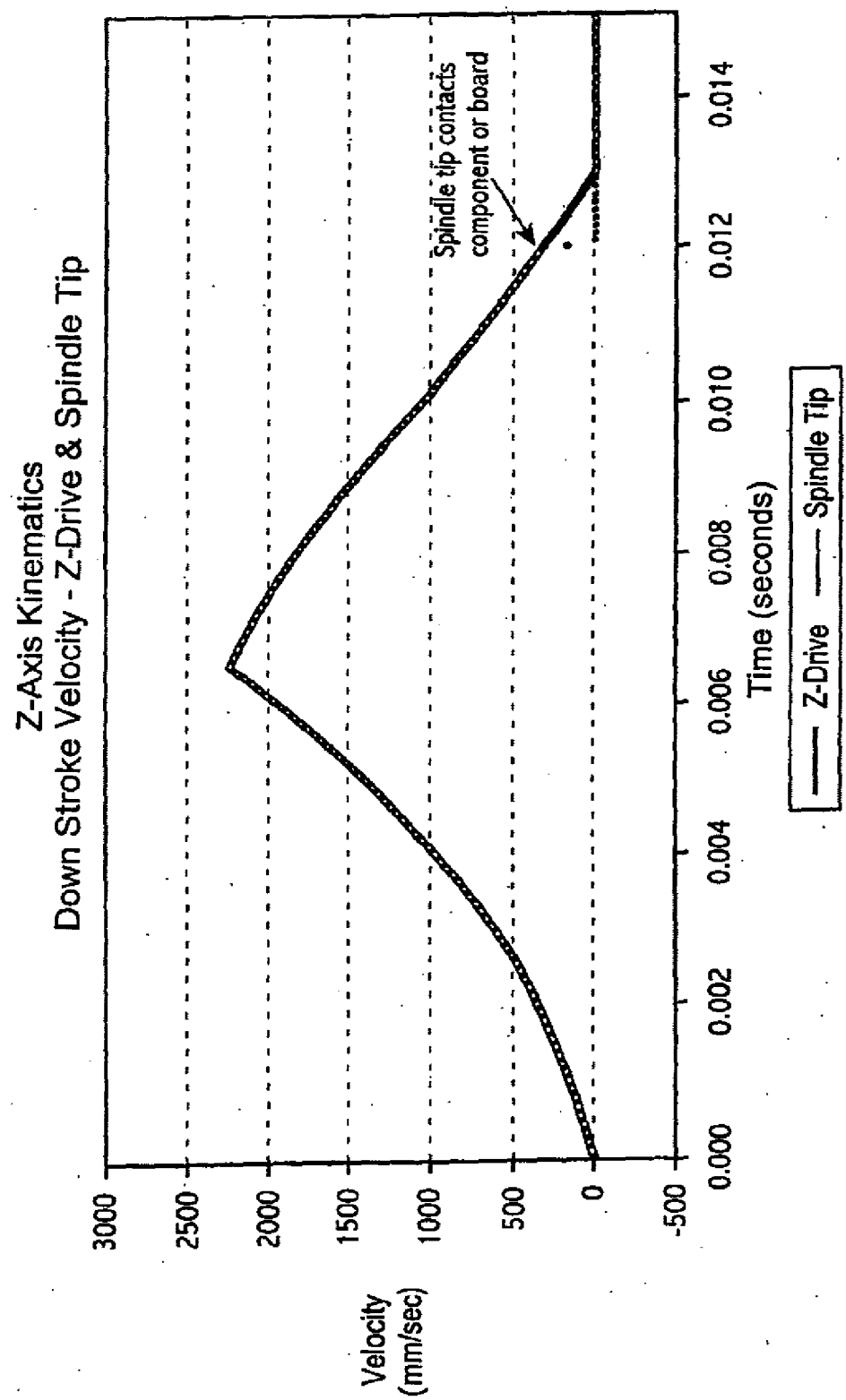

The velocity 104 of the drive arm 72 compared to the that of the spindle 26 can be seen in FIG. 7. As illustrated in FIG. 7, at about 0.012 seconds of a preferred exemplary cycle, the lower tip of the spindle 26 contacts the component to be picked up. At that time, the velocity 104 of the spindle 26 drops to zero, while the drive arm 72 continues to move downwardly for a brief period of time. The continued downward movement of the drive arm 72 is enabled by the spindle recess 38 in the spindle 26.

In the preferred exemplary embodiment, the total mass of the spindle 26 and nozzle at the end thereof is about 8.9 grams, and the mass of the contact button 76 is about 1.09 grams. The force of the first blade spring 80 on the contact button 76 is about 150 grams, and, the force of the second blade spring 82 is about 500 grams.

The force required to accelerate the spindle 26 to about 57.1 g's is equal to about 560.4 grams, i.e., the mass of 9.99 grams multiplied by the acceleration of 57.1 g's. Accordingly, the force applied by both first and second blade springs 80, 82 is sufficient to accelerate the spindle 26 to about 57.1 g's. However, when only the first blade spring 80 is applied, the spindle 26 can only be accelerated to about 16 g's, i.e., the force of 160 grams (the first blade spring 80 force and the weight of spindle 26) divided by the mass of spindle 26 (9.99 grams). Thus, if only the first blade spring 80 is applied, the first blade spring 80 will deflect at about 16 g's.

Although the disclosed preferred embodiment includes two flanges 93 and two stops 92, the present invention is not limited to that structure. Alternative embodiments utilizing one or more stops and flanges can be used.

In order to lower the spindle 26 into contact with a die or component to be picked up by the spindle 26, the motor 60 drives the drive crank 64, which moves the drive arm 72 so that the free end 74 of the drive arm 72 contacts the top 46 of the spindle assembly head 34. As the drive arm 72 rotates downwardly, the free end 74 pushes the spindle assembly head 34 downwardly. Such action enables the spindle 26 to move downwardly. Simultaneously, the first blade spring 80 and the second blade spring 82 urge the contact button 76 against the top 44 of the spindle, thus urging the spindle 26 downwardly in unison with the spindle assembly head 34. The downward urging on the spindle 26 overcomes any inertia that the spindle 26 may have had, and enables the spindle 26 to move downwardly at a fast rate of acceleration.

After the free end 74 of the drive arm 72 has moved downwardly approximately 5 millimeters, the flanges 93 of the second blade spring 82 contact the stops 92. The stops 92 then lift the second blade spring 82 off of the first blade spring 80 thus eliminating the pressure from the second blade spring 82 on the first blade spring 80. For the remainder of the downward stroke of the drive arm 72, only the first blade spring 80 is urging the contact button 76 against the top 44 of the spindle 26.

In the preferred exemplary embodiment, the first part of the stroke, i.e., the first 5 millimeters, is referred to herein as the first portion of the stroke. The remainder of the downward portion of the stroke is referred to as the second portion of the stroke.

When the lower end of the spindle 26 contacts the die or component that is to be picked up, further downward movement of the spindle 26 is stopped. At the same time, the free end 74 of the drive arm 72 may continue to push the spindle head assembly 34 downwardly. However, because the spindle 26 is no longer moving downwardly, the spindle 26 lifts the contact button 76 off of the shoulder 78 for the contact button 76. Such upward movement of the contact button 76, relative to the drive arm 72, causes a deflection of the first blade spring 80, which at this time is not being restrained by the second blade spring 82. The deflection of the first blade, spring 80 is sensed by the strain gauge 90, which immediately sends a signal to the control processor controlling the motor 60, as well as other aspects of the spindle driving assembly 14.

The signal from the strain gauge 90 is used to control the downward movement of the drive arm 72 so as to control the force of touch between the spindle 26 and the component during pickup of the component and the force of touch between the spindle 26 and the substrate during placement of the component.

In an alternative embodiment, the first blade spring 80 is designed so that it contacts only a portion of the projecting contact button 76. And, the second blade spring 82 is designed to contact a different portion of the contact button 76. One way in which this can be accomplished is to have a flange around the contact button 76 and an opening in the first blade spring 80. The different portion of the contact button 76 projects through the opening in the first blade spring 80 and directly contacts the second blade spring 82. The flange of the contact button 76 is aligned with a shoulder of the opening in the first blade spring 80. In this way, both the first and second blade springs 80, 82 are able to directly contact the contact button 76, and the second blade spring 82 can be lifted off the contact button 76 during the second portion of the cycle, as described above, through the use of aforementioned stops 92 and flanges 93, or through some other suitable mechanism.

The system of the present invention can be used to drive the spindle 26 in at least two modes, a low force mode and a high force mode. In the low force mode, the force of the first blade spring 80 alone acts on the spindle 26 through the contact button 76. In other words, the second blade spring 82 is lifted off of the first blade spring 80 and does not contribute to the force applied to the spindle 26. Thus, the force is limited to that created by the first blade spring 80, and is relatively light.

In the high force mode, the free end 74 of the drive arm 72 engages the spindle assembly head 34 and forces the spindle assembly head 34 down with the force of the motor 60 acting through the drive crank 64. In the high force mode, the spindle engaging flange 36 within the spindle assembly head 34 engages with the lower shoulder 42 of the spindle recess 38 and moves the spindle 26 downward with the force of the motor 60. The high force mode can be used in situations where, for example, pins on a component need to be inserted into a socket.

Thus, the spindle driving assembly 14 of the present invention is able to quickly move the spindle 26 into engagement with the die or component to be picked up, with minimum risk of contacting the die or component with a force that may damage the die or component.

The system of the present invention can be run first in a learning cycle, wherein the control system learns the length of the stroke before the spindle 26 contacts the component or substrate. Thus, the speed of the motor 60 can be appropriately controlled in order to maximize the speed of the stroke and minimize the time required for each subsequent production cycle.

In a typical cycle, the length of the stroke, i.e., movement of the spindle 26, is about 0.500 inch. For approximately the first 0.200 inch, the spindle 26 is in an acceleration mode, for approximately the next 0.100 inch, the spindle 26 is no longer accelerating, but travels at the maximum speed. For the last 0.200 inch, the motor 60 begins to decelerate the speed at which the spindle 26 moving. The mentioned distances are merely exemplary, and the present invention is not limited to these examples.

In an alternative embodiment, the contact button 76 may be omitted so that a first blade spring 80 applies a force directly on the spindle 26. Such an embodiment would include a drive member mounted for movement from a first position to a second position through a range of movement; a first blade spring 80 pressing on a spindle 26 in the spindle driving assembly 14 with a first force; a second blade spring 82 pressing a second force on the spindle 26 in the spindle driving assembly 14 either directly or indirectly; and a stop element arranged to limit the force of the of the second blade spring 82; the second blade spring 82 arranged such that when the drive member is within a first portion of the range of movement, the second blade spring 82 exerts the second force on the spindle 26 so as to increase a net force exerted on the spindle 26, and when the drive member is in a second portion of the range of movement, the stop element limits the application of the second blade spring 82 to reduce or eliminate the force applied by the second blade spring 82 on the spindle 26 so as to decrease the net force exerted on the spindle 26; wherein movement of the drive member drives the spindle 26.

In the embodiments disclosed above, the spindle 26 is moved by means of a pivoting drive arm 72. However, the concepts of the present invention are equally applicable to other embodiments. For example, in an alternative embodiment, the spindle 26 can be driven by an in-line drive member, rather than the drive arm 72 disclosed above. The in-line drive member may use a system of coil springs or some other flexible member to serve the function performed by the first and second blade springs 80,82 of the above-described embodiments.

For example, in the embodiment using an in-line drive member, a first spring may act on a contact member in the drive member, and the contact member acts on a spindle 26. The first spring can be a coil spring or some other kind of spring. A second spring can then be used to apply a second force either directly on the contact member or on to the first spring. A stop mechanism can be used to limit the application of the second spring.

Although the present invention has been disclosed in use on a pick and place head 12 having a horizontal axis of rotation, one of ordinary skill in the art will appreciate that the present invention has applications on other devices. For example, the present invention can be used on a pick and place machine having a Japanese style stationary turret chip shooter. In such a device, the pick and place head has a vertical axis of rotation, and a z-axis drive mechanism according to the present invention is mounted adjacent the rear portion of the pick and place head to drive a spindle assembly adjacent a component feeder. A second z-axis drive mechanism according to the present invention is mounted adjacent the front portion of the pick and place head to drive a spindle assembly adjacent a circuit board onto which a component is to be placed. In such an arrangement, one z-axis drive mechanism controls picking up the die or component, and the second z-axis drive mechanism controls placement of the die or component. In such a system, the pick and place head rotates about the vertical axis, but is otherwise stationary. The component feeder and the board handler are moved to ensure proper alignment of the feeder to the first z-axis drive mechanism for pick-up, and to ensure proper alignment of the PCB location for placement by the second z-axis drive mechanism.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An apparatus for moving a spindle along a longitudinal axis, the apparatus comprising:
   a spindle;
   a drive member for moving said spindle over a range of travel along said longitudinal axis in a first direction;
   means for applying a first force in combination with a second force to the spindle in the first direction;
   a stop element arranged so as to disengage the second force, such that when said spindle is within a first portion of said range of travel, said first force is applied to said spindle in combination with said second force, and when said spindle is within a second portion of said range of travel, said stop element disengages said second force so only said first force is applied to said spindle.

2. The apparatus of claim 1, wherein the drive member moves the spindle with an acceleration exceeding 20 g.

3. The apparatus of claim 1, wherein the spindle can remain stationary by application of only the first force.

4. The apparatus of claim 1, further comprising means to generate a machine readable signal when only the first force is applied and the spindle is stationary.

5. The apparatus of claim 4, wherein the means to generate a machine readable signal includes a strain guage.

6. A spindle driving assembly comprising:
   a spindle;
   a spindle drive member mounted for movement from a first position to a second position through a range of movement;
   a first spring pressing on the spindle either directly or indirectly with a first force;
   a second spring pressing a second force on the spindle in the spindle driving assembly either directly or indirectly; and
   a stop element arranged to disengage the force of the of the second spring so that when the drive member is within a first portion of the range of movement, the first spring and the second spring press forces on the spindle and when the drive member is in a second portion of the range of movement, the stop element disengages the force applied by the second spring on the spindle;
   wherein movement of the drive member drives the spindle.

7. The apparatus of claim 6, wherein during the first portion of the range of travel the spindle accelerates with an acceleration exceeding 20 g.

8. A method of moving a spindle along a longitudinal axis, the method comprising:

moving said spindle with acceleration during a first portion of a range of travel along said longitudinal axis;

moving said spindle with deceleration during a second portion of a range of travel along said longitudinal axis, applying a first force and a second force to the spindle, either directly or indirectly, during the spindle acceleration in order to counter any resistance of the spindle to the acceleration;

disengaging the second force; and applying only the first force to the spindle, either directly or indirectly, during the spindle deceleration.

9. The method of claim 8, wherein the spindle moves with an acceleration exceeding 20 g during the first portion of the range of travel.

* * * * *

UNITED STATES PATENT AND TRADEMARK OFFICE
CERTIFICATE OF CORRECTION

PATENT NO. : 6,848,338 B1
DATED : February 1, 2005
INVENTOR(S) : Gieskes et al.

It is certified that error appears in the above-identified patent and that said Letters Patent is hereby corrected as shown below:

Drawings,
Please delete drawings sheets 2 and 5-7 an insert drawing sheets 2 and 5-7 attached Column 1,
Line 59, delete "stop clement arranged" and insert -- stop element arranged --

Column 3,
Line 5, delete "104" and insert -- 102 --
Line 59, delete "spindle.assembly" and insert -- spidle assembly --

Column 5,
Line 8, delete "to the that" and insert -- to that --

Column 7,
Line 35, delete "pivoting"

Signed and Sealed this

Thirty-first Day of May, 2005

JON W. DUDAS
*Director of the United States Patent and Trademark Office*